(12) United States Patent
Fukuda et al.

(10) Patent No.: US 8,695,326 B2
(45) Date of Patent: Apr. 15, 2014

(54) FUEL ADDITION CONTROL METHOD APPLIED TO EXHAUST EMISSION PURIFIER OF INTERNAL COMBUSTION ENGINE AND EXHAUST EMISSION PURIFIER

(75) Inventors: Koichiro Fukuda, Sunto-Gun (JP); Taro Aoyama, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 120 days.

(21) Appl. No.: 13/366,085

(22) Filed: Feb. 3, 2012

(65) Prior Publication Data

US 2012/0151901 A1    Jun. 21, 2012

Related U.S. Application Data

(62) Division of application No. 12/226,573, filed as application No. PCT/JP2007/060637 on May 24, 2007, now Pat. No. 8,336,294.

(30) Foreign Application Priority Data

May 24, 2006 (JP) ................................. 2006-143774

(51) Int. Cl.
*F01N 3/00* (2006.01)

(52) U.S. Cl.
USPC .................................. 60/286; 60/285; 60/295

(58) Field of Classification Search
USPC ..................... 60/285, 286, 274, 297, 301, 295
See application file for complete search history.

(56) References Cited

U.S. PATENT DOCUMENTS

| 7,299,625 | B2 | 11/2007 | Uchida et al. | |
| 7,320,214 | B2 | 1/2008 | Kanazawa et al. | |
| 7,454,900 | B2 | 11/2008 | Hayashi | |
| 7,841,169 | B2 | 11/2010 | Yokoi et al. | |
| 2005/0109014 | A1* | 5/2005 | Hayashi | 60/274 |
| 2005/0223698 | A1 | 10/2005 | Murata et al. | |
| 2006/0070373 | A1 | 4/2006 | Huang et al. | |
| 2007/0022745 | A1* | 2/2007 | Narita et al. | 60/286 |
| 2007/0214769 | A1* | 9/2007 | Fukuda et al. | 60/274 |

FOREIGN PATENT DOCUMENTS

EP    1 515 017 A2    3/2005

(Continued)

OTHER PUBLICATIONS

Oct. 17, 2012 Notice of Allowance issued in U.S. Appl. No. 12/226,573.
Search Report issued in European Patent Application No. 07744071.7, on Apr. 26, 2010.

(Continued)

*Primary Examiner* — Thomas Denion
*Assistant Examiner* — Kelsey Stanek
(74) *Attorney, Agent, or Firm* — Oliff PLC

(57) ABSTRACT

An exhaust emission purifier is provided and able to suppress overheating of an exhaust emission purifying catalyst and execute fuel addition promptly when fuel addition to the exhaust emission purifying catalyst is requested. In the exhaust emission purifier of an internal combustion engine, exhaust purifying cycles are repeated in order that the exhaust emission purifying catalyst is to be regulated at a target temperature, the cycle being a combination of an addition period during which fuel is added from the fuel addition valve and a halt period during which fuel addition is halted, and the fuel addition valve is manipulated such that the halt period is disposed so as to sandwich the addition period in the cycle.

9 Claims, 16 Drawing Sheets

(56) References Cited

FOREIGN PATENT DOCUMENTS

| | | | |
|---|---|---|---|
| JP | A-2003-166415 | | 6/2003 |
| JP | A-2004-353528 | | 12/2004 |
| JP | A-2005-133562 | | 5/2005 |
| JP | 2005291039 | * | 10/2005 |
| JP | A-2005-291039 | | 10/2005 |
| JP | 2005337039 | * | 12/2005 |
| JP | A-2005-337039 | | 12/2005 |
| WO | WO 2005/116431 A1 | | 12/2005 |

OTHER PUBLICATIONS

English-language Translation of Chinese Office Action issued in corresponding Chinese Application No. 200780018671.9, issued Jun. 2, 2010.

Office Action dated Mar. 13, 2012 issued in U.S. Appl. No. 12/226,573.

Office Action dated Jun. 22, 2012 issued in U.S. Appl. No. 12/226,573.

* cited by examiner

FUEL ADDITION CONTROL METHOD APPLIED TO EXHAUST EMISSION PURIFIER OF INTERNAL COMBUSTION ENGINE AND EXHAUST EMISSION PURIFIER

This is a Divisional of application Ser. No. 12/226,573 filed Nov. 17, 2008. The disclosure of the prior application is hereby incorporate by reference herein in its entirety.

TECHNICAL FIELD

The present invention relates to an exhaust emission purifier of an internal combustion engine, which adds fuel at the upstream of the exhaust emission purifier in order that the exhaust emission purifying device such as a NOx storage-reduction catalyst is to be regulated at a target temperature, and a fuel addition control method thereof.

RELATED ART

A NOx storage-reduction catalyst used as an exhaust emission purifying device of a lean burn type internal combustion engine (a diesel engine, for example) is degraded in its catalyst function owing to the deposition of the sulfur oxide contained in exhaust emission. Consequently, in the case that a NOx storage-reduction catalyst is used, a regeneration process called S-regeneration is required to be executed periodically in order to restore its catalyst function by decomposing and removing sulfur oxide deposited in the catalyst. The S-regeneration is fulfilled by elevating the temperature of the catalyst up to a higher target temperature (for example, equal to ore higher than 600° C.) than a temperature range in a normal operation condition and by keeping the air fuel ratio in the vicinity of the catalyst at the theoretical air fuel ratio or in the rich region. Elevation of the temperature of the catalyst is fulfilled by adding fuel as a reducing agent in exhaust emission, for example. However, in the case that an amount of fuel required to regulate the temperature of a catalyst at a target temperature is added continuously, reducing reactions continue, and thus the temperature of the catalyst might be elevated extremely high. In this circumstance, an exhaust emission purifier is proposed in which a fuel addition valve is manipulated such that cycles are repeated in order that the temperature of the NOx storage-reduction catalyst is to be regulated at a target temperature in S-regeneration, wherein the cycle is a combination of an addition period during which fuel is added from a fuel addition valve, and a halt period during which fuel addition is halted, and fuel addition permission in each of the cycles by the fuel addition valve is controlled such that a half of the halt period is disposed as a pre-addition halt period before the addition period (see patent document 1, for example).

Patent document 1: JP2005-A-337039

SUMMARY OF INVENTION

Problems to be Solved by the Invention

Suitable operation conditions of a NOx storage-reduction catalyst for S-regeneration process are limited. In general, S-regeneration process is executed when the operation condition of an internal combustion engine is in an operation condition suitable for S-regeneration process. Accordingly, when S-regeneration process is required to be executed, it is preferable that fuel addition is executed promptly when the operation condition of an internal combustion engine is in a suitable operation condition for S-regeneration process. In the exhaust emission purifier of the patent document 1, the length of the pre-addition halt period is fixed to a half of the halt period. Accordingly, the chance of S-regeneration can be easily lost, for example, when the operation condition of an internal combustion engine is deviated from the suitable operation for S-regeneration in the pre-addition halt period.

In this circumstance, it is an object of the present invention to provide a fuel addition control method of an exhaust emission purifier of an internal combustion engine and an exhaust emission purifier suitable for embodying the method, in the method overheats of an exhaust emission purifying device such as a NOx storage-reduction catalyst can be suppress, and fuel addition to the exhaust emission purifying device can be executed promptly.

Means for Solving Problem

A fuel addition control method of the present invention is applied to an exhaust emission purifier of an internal combustion engine, the exhaust emission purifier including an exhaust emission purifying device of purifying exhaust emission of an internal combustion engine and a fuel addition device of adding fuel from upstream of the exhaust emission purifying device, cycles being repeated in the fuel addition control method in order that the exhaust emission purifying device is to be regulated at a target temperature, the cycle being a combination of an addition period during which fuel is added from the fuel addition device and a halt period during which fuel addition from the fuel addition device is halted, and the fuel addition device being operated such that the halt period is split to sandwich the addition period in each of the cycles, wherein the fuel addition device is manipulated such that the length of a pre-addition halt period, which is a halt period disposed before the addition period, is varied in accordance with the temperature of the exhaust emission purifying device at the start point of the cycle. Thus, the method solves the above problem.

According to the fuel addition control method of the present invention, the pre-addition halt period is disposed before the addition period. Thus, by lowering the temperature of the exhaust emission purifying device in the pre-addition halt period, the extreme elevation of the temperature of the exhaust emission purifying device in the subsequent addition period can be suppressed. The temperature width by which the temperature of the exhaust emission purifying device should be lowered in the pre-addition halt period in order that overheats of the exhaust emission purifying device in the addition period is prevented differs in accordance with the temperature of the exhaust emission purifying device at the start point of a cycle. Since the temperature width by which the temperature should be lowered in the pre-addition halt period is correlated with the length of the pre-addition halt period, a pre-addition halt period having an appropriate length of able to prevent overheats of the exhaust emission purifying device in the addition period can be set by varying the length of the pre-addition halt period in accordance with the temperature of the exhaust emission purifying device at the start point of the cycle. Accordingly, it can be prevented to provide with an unnecessarily long pre-addition halt period. Thus, fuel addition can be executed promptly.

In an aspect of the fuel addition control method of the present invention, the fuel addition device may be manipulated such that the length of the pre-addition halt period gets shorter as the temperature of the exhaust emission purifying device at the start point of the cycle gets lower. As the pre-addition halt period is set longer, the temperature of the exhaust emission purifying device can be further lowered in the pre-addition halt period. However, in the case that the temperature of the exhaust emission purifying device has already lowered, overheats of the exhaust emission purifying device can be prevented without providing with the pre-addition halt period. Accordingly, the length of the pre-addition halt period is set shorter, as the temperature of the exhaust emission purifying device at the start point of a cycle gets lower, and thus fuel addition is executed promptly.

The exhaust emission purifier of an internal combustion engine of the present invention includes a NOx storage-reduction catalyst disposed in an exhaust passage of the internal combustion engine; a fuel addition device of adding fuel from upstream of the NOx storage-reduction catalyst; and an addition control device of controlling the fuel addition device such that cycles are repeated in order that the NOx storage-reduction catalyst is to be regulated at a target temperature, the cycle being a combination of an addition period during which fuel is added from the fuel addition device and a halt period during which fuel addition from the fuel addition device is halted, and the fuel addition device being operated such that the halt period is split to sandwich the addition period in each of the cycles, wherein the addition control device comprises: temperature requesting addition amount computing means of computing a fuel addition amount required to regulate the NOx storage-reduction catalyst at the target temperature; expected addition amount computing means of computing a fuel addition amount required to keep the air fuel ratio in the NOx storage-reduction catalyst at a target air fuel ratio over a prescribed period; period computing means of computing the length of the cycle on the basis of the addition amounts computed respectively by the temperature requesting addition amount computing means and the expected addition amount computing means and of computing the length of the halt period in the cycle by subtracting the prescribed period serving as the addition period from the length of the cycle obtained; pre-addition halt period computing means of computing the length of a pre-addition halt period, which is a halt period disposed before the addition period, on the basis of the length of the halt period computed by the period computing means and the temperature of the NOx storage-reduction catalyst at the start point of the cycle; and addition timing control means of controlling fuel addition permission from the fuel addition device such that a pre-addition halt period having the length computed by the pre-addition halt period computing means is disposed before the addition period. Thus, the above problem is solved.

According to the exhaust emission purifier of an internal combustion engine of the present invention, the length of the pre-addition halt period is set in accordance with the temperature of the NOx storage-reduction catalyst at the start point of a cycle. Thus, a pre-addition halt period having an appropriate length of able to prevent overheats of the NOx storage-reduction catalyst in the addition period can be set in a similar manner to the fuel addition control method of the present invention. Accordingly, it can be prevented to set an unnecessarily long pre-addition halt period. Thus, fuel addition to the NOx storage-reduction catalyst can be executed promptly. Moreover, since the pre-addition halt period is disposed prior to the addition period, an extreme elevation of the temperature of the exhaust emission purifying device in the addition period can be suppressed by lowering the temperature of the exhaust emission purifier in the pre-addition halt period.

In an aspect of the exhaust emission purifier of the present invention, the pre-addition halt period computing means may compute a shorter length of the pre-addition halt period, as the temperature of the NOx storage-reduction catalyst at the start point of the cycle gets lower. In this aspect, the length of the pre-addition halt period is shorter, as the temperature of the NOx storage-reduction catalyst at the start point of the cycle gets lower. Thus, fuel addition to the NOx storage-reduction catalyst can be executed promptly while suppressing overheats of the NOx storage-reduction catalyst in the addition period, in a similar manner to the aspect of the fuel addition control method of the present invention described above.

In an aspect of the exhaust emission purifier of the present invention, the pre-addition halt period computing means may include degradation level correcting means of correcting the length of the pre-addition halt period shorter as the NOx storage-reduction catalyst is degraded. When the NOx storage-reduction catalyst is degraded, reaction rate in the catalyst is reduced. Thus, even when the same amount of fuel is added as before degradation, the temperature of the catalyst is hard to be elevated. Since the temperature of the catalyst is hard to be elevated when the NOx storage-reduction catalyst is degraded in this way, overheats of the NOx storage-reduction catalyst in the addition period can be suppressed even when the length of the pre-addition halt period is reduced. Accordingly, the length of the pre-addition halt period is corrected shorter as the NOx storage-reduction catalyst is degraded. Thus, fuel addition to the NOx storage-reduction catalyst can be executed more promptly by further reducing the length of the pre-addition halt period.

In an aspect of the exhaust emission purifier of the present invention, the pre-addition halt period computing means may compute the length of the pre-addition halt period on the basis of the temperature difference between the temperature of the NOx storage-reduction catalyst at the start point of the cycle and the temperature of exhaust emission of the internal combustion engine at the start point of the cycle. When no fuel is added to the NOx storage-reduction catalyst, the temperature of the catalyst gets almost same as the temperature of exhaust emission. Namely, in the case that the temperature of the catalyst is elevated though fuel addition, its reference is set at the temperature of exhaust emission. As is generally known, the temperature of exhaust emission is varied in accordance with the operation condition of the internal combustion engine. Thus, by setting the length of the pre-addition halt period on the basis of the temperature difference between the temperature of catalyst and the temperature of exhaust emission in this way, overheats of the NOx storage-reduction catalyst in the addition period can be suppressed more reliably, as well as the pre-addition halt period suitable for the operation condition of the internal combustion engine at the time can be computed. Moreover, since the temperature of exhaust emission is computed by taking the length of the pre-addition halt period into consideration, the much minimum length of the pre-addition halt period can be computed precisely. Accordingly, fuel addition to the NOx storage-reduction catalyst can be executed more promptly.

In an aspect of the exhaust emission purifier of the present invention, the pre-addition halt period computing means may include addition period correcting means of correcting the length of the pre-addition halt period longer as the addition period gets longer. Since the elevation width of the temperature of the NOx storage-reduction catalyst gets larger in the addition period as the addition period gets longer, it is necessary to lower the temperature of the NOx storage-reduction catalyst in advance in the pre-addition halt period, in accordance with the elevation width of the temperature of the NOx storage-reduction catalyst in the addition period. Accordingly, the length of the pre-addition halt period is corrected longer as the addition period gets longer. Thus, overheats of the NOx storage-reduction catalyst in the addition period can be suppressed more reliably.

In an aspect of the exhaust emission purifier of the present invention, the addition timing control means may add fuel from the fuel addition device in order that the addition period should start at the time point when the temperature of the NOx storage-reduction catalyst reaches equal to or lower than the prescribed lower limit temperature, in the case that the temperature of the NOx storage-reduction catalyst in the pre-addition halt period reaches equal to or lower than a preset prescribed lower limit temperature. According to this aspect, when the temperature of the NOx storage-reduction catalyst reaches equal to or lower than the prescribed lower limit temperature even in the pre-addition halt period, fuel addition is executed. Thus, fuel addition to the NOx storage-reduction catalyst can be executed more promptly. Moreover, since the fuel addition is executed when the temperature of the NOx storage-reduction catalyst reaches equal to tor lower than the prescribed lower limit temperature, overheats of the NOx storage-reduction catalyst in the addition period can be suppressed more reliably by setting the prescribed lower limit temperature appropriately.

In this aspect, the addition control device may further include addition period length correcting means of correcting the length of the addition period on the basis of a ration between a time from the start point of the cycle to the time point when the temperature of the exhaust emission purifying device reaches equal to or lower than the prescribed lower limit temperature in the pre-addition halt period and the length of the pre-addition halt period computed by the pre-addition halt period computing means. By correcting the length of the addition period in this way, the addition period can be set to have an appropriate length corresponding to the time during which fuel is really not added prior to the addition period. For example, when fuel addition is executed without correcting the length of the addition period, in the case that the time during which fuel addition is really halted prior to the addition period is shorter than the computed pre-addition halt period, overheats of the NOx storage-reduction catalyst might occur. Accordingly, by correcting the addition period in the above way, overheats of the NOx storage-reduction catalyst in the addition period is suppressed.

Furthermore, the addition timing control means may continue the pre-addition halt period by prohibiting fuel addition from the fuel addition device even when the temperature of the NOx storage-reduction catalyst reaches equal to or lower than the prescribed lower limit temperature in the pre-addition halt period, in the case that the length of the addition period corrected by the addition period length correcting means is equal to or shorter than a preset prescribed lower limit. If the length of the addition period is too short, the temperature of the NOx storage-reduction catalyst could not be regulated safely at the target temperature even when fuel addition is executed. In this case, fuel has been vainly added. Accordingly, in the case that the length of the corrected addition period is equal to shorter than a prescribed lower limit, the pre-addition halt period is continued even when the temperature of the exhaust emission purifying device reaches equal to or lower than the prescribed lower limit temperature. By continuing the pre-addition halt period in this way and thus setting the length of the addition period equal to or longer than a prescribed lower limit, unnecessary fuel addition is prevented.

In an aspect of starting fuel addition when the temperature of the exhaust emission purifying device reaches equal to or lower than a preset prescribed lower limit temperature in the pre-addition halt period, the addition control device regulates the temperature of the NOx storage-reduction catalyst at a target temperature, when S-regeneration process in which sulfur oxide is released from the NOx storage-reduction catalyst is requested, and the addition timing control means is required to execute S-regeneration process of an upstream part of the catalyst, which is an upstream part of the NOx storage-reduction catalyst in a flow of exhaust emission, and the addition timing control means may add fuel from the fuel addition device such that the addition period should start at the time point when the temperature of the NOx storage-reduction catalyst reaches equal to or lower than the prescribed lower limit temperature in the case that the temperature of the NOx storage-reduction catalyst in the pre-addition halt period reaches equal to or lower than the prescribed lower limit temperature. The NOx storage-reduction catalyst has a temperature distribution inside thereof. Even when the temperature of the upstream part of the NOx storage-reduction catalyst gets lowered, the temperature of the parts other than the upstream part are hard to be lowered in temperature, owing to the heat capacity of the catalyst itself, in comparison with the upstream part. Accordingly, by limiting the start condition of fuel addition in the pre-addition halt period to a case when S-regeneration process of the upstream part of the NOx storage-reduction catalyst needs to be executed and the temperature of the NOx storage-reduction catalyst reaches equal to or lower than the prescribed lower limit temperature, it can be prevented that an unnecessarily long addition period is disposed after S-regeneration process of the upstream part of the catalyst is completed. It is noted that, even when the temperature of the upstream part of the catalyst gets lowered, the temperature of the other parts is hard to be lowered, and thus S-regeneration process can be executed by promptly elevating the temperature of the parts of the catalyst other than the upstream part to a suitable temperature for S-regeneration process through executing fuel addition.

BEST MODE FOR CARRYING OUT THE INVENTION

First Embodiment

Figure 1:
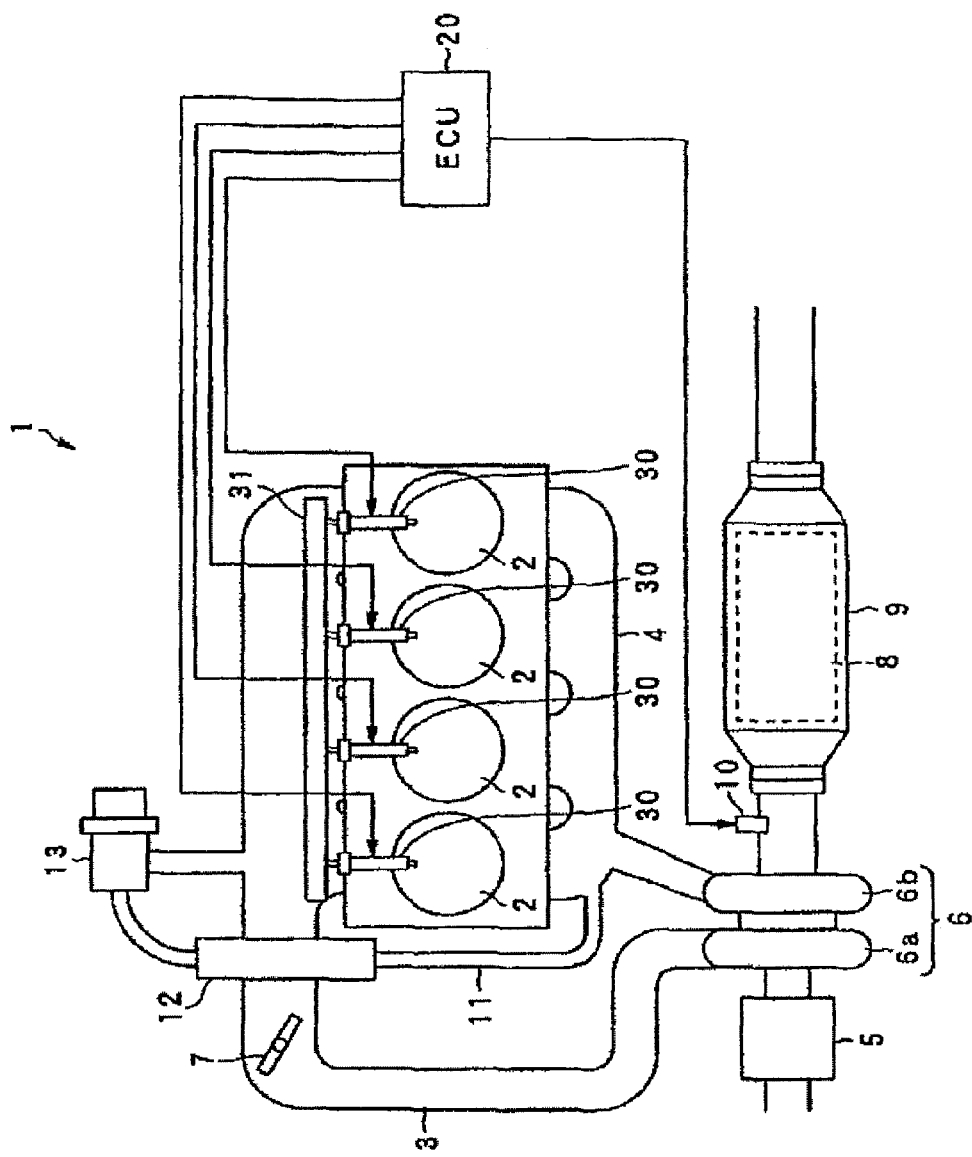
FIG. 1 is a view showing an embodiment of the present invention applied to a diesel engine.

FIG. 1 illustrates an embodiment of the present invention applied to a diesel engine 1 serving as an internal combustion engine. The engine 1 is mounted on a vehicle as a source of power to drive. An intake passage 3 and an exhaust passage 4 are connected to the cylinders 2 of the engine 1. The intake passage 3 is provided with an air filter 5 for filtrating intake gas, a compressor 6a of a turbocharger 6, and a throttle valve 7 for regulating intake gas amount. The exhaust passage 4 is provided with a turbine 6b of the turbocharger 6. An exhaust emission purifying unit 9 including a NOx storage-reduction catalyst 8 (it will be referred as a catalyst for short in the following.) serving as an exhaust emission purifying device is disposed in the exhaust passage 4 at the downstream of the turbine 6b, and a fuel addition valve 10 serving as a fuel addition device of adding fuel as a reducing agent is disposed in the exhaust passage 4 at the upstream of the catalyst 8. The exhaust passage 4 and the intake passage 3 are connected to each other via an EGR passage 11, and the EGR passage 11 is provided with an EGR cooler 12 and an EGR valve 13.

The fuel addition valve 10 is provided in order to generate a reductive atmosphere required to release NOx adsorbed in the catalyst 8 or for S-regeneration of the catalyst 8 by adding fuel at the upstream of the catalyst 8. The fuel adding operation of the fuel addition valve 10 is controlled by the engine control unit (ECU) 20. ECU 20 is a well-known computer unit which controls the operation condition of the engine 1 by manipulating various devices such as an injector 30 for injecting fuel to the cylinder(s) 2, and a pressure regulating valve for a common-rail 31 of storing fuel pressure to be supplied to the injector 30. ECU 20 controls a fuel injecting operation of the injector 30 such that an air fuel ratio, which is given as a mass ratio of air taken in the engine 1 to the fuel added from the injector 30 is regulated to a leaner side than the theoretical air fuel ratio. Moreover, ECU 20 functions as an addition control device of the present invention by executing the routines shown in FIG. 4 and FIG. 5. It is noted that the details of these routines will be described later. There exist various other targets controlled by ECU 20, however; these will be omitted here in the drawings.

Figure 2:
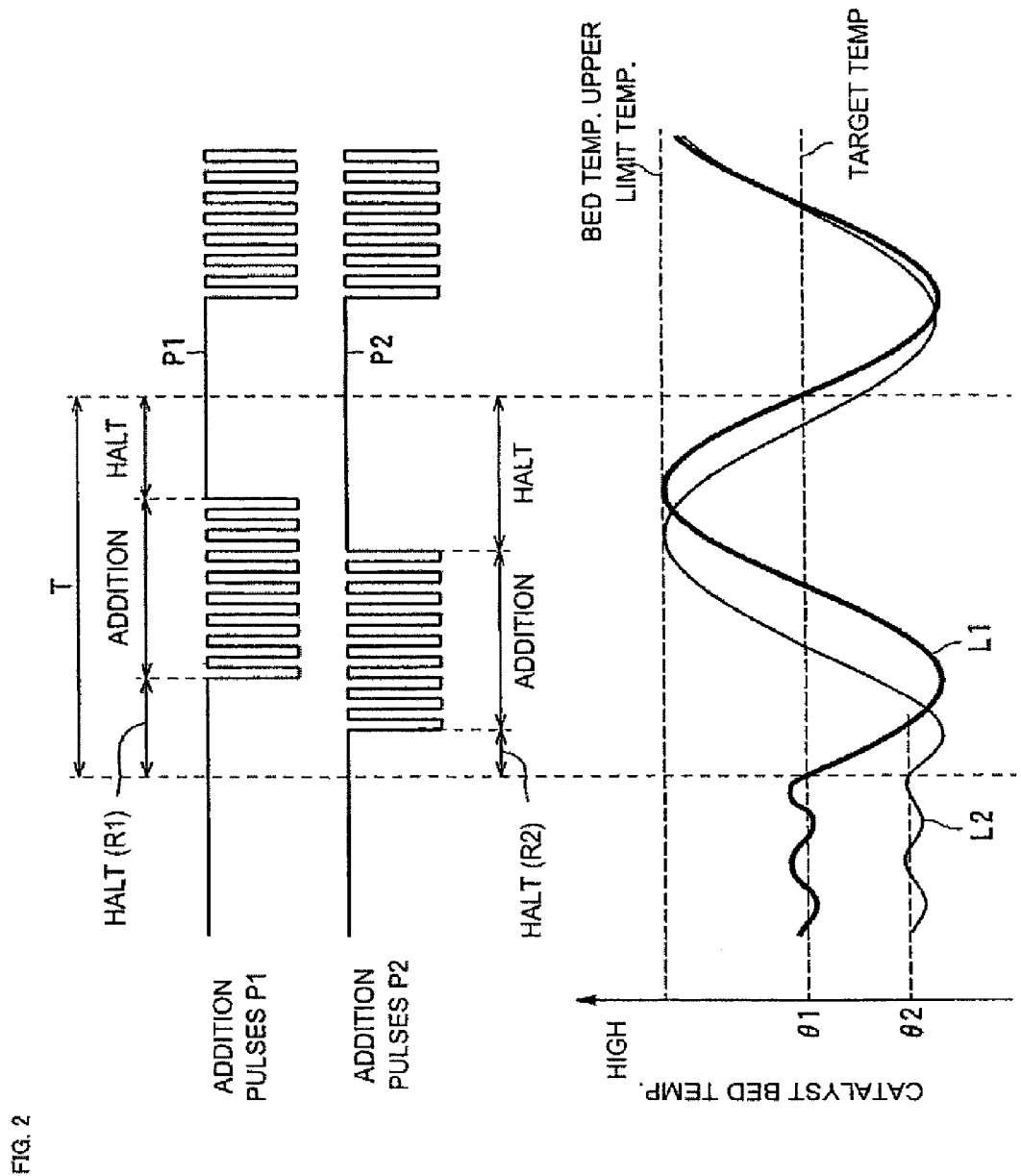
FIG. 2 is a view showing examples of the relations between the addition pulse for a fuel addition valve and the catalyst bed temperature when a fuel addition control of the present invention is executed.

Next, an overview of the fuel addition control by ECU 20 will be described with reference to FIG. 2 in a case of regulating the catalyst 8 at a target temperature in S-regeneration. FIG. 2 shows examples of the relation between the addition pulse for the fuel addition valve 10 and the temperature of the catalyst 8 (it will be also referred as "catalyst bed temperature" in the following) when the fuel addition control of the present invention is executed. It is noted that the line L1 in FIG. 2 represents the change in the catalyst bed temperature when fuel addition from the fuel addition valve 10 is regulated by the addition pulse P1, and the line L2 in FIG. 2 represents the change in the catalyst bed temperature when fuel addition from the fuel addition valve 10 is regulated by the addition pulse P2, respectively. In the fuel addition control of FIG. 2, cycles T are repeated multiple times, and fuel is added in the cycle at the successive multiple pulses. In the cycle T, the span during which successive pulses exist corresponds to an addition period of fuel. As shown in FIG. 2, halt periods during which fuel addition is halted are disposed respectively in each cycle before and after an addition period during which fuel is added. In the following, the halt period disposed before the addition period will be also referred as pre-addition halt period, and the halt period disposed after the addition period will be also referred as post-addition halt period, respectively. It is noted that the length of the respective cycle and the length of the addition period are set on the basis of the fuel amount to be added in the cycle, and that the length of the halt period which is the total of the pre-addition halt period and post-addition halt period is computed by subtracting the length of the addition period from the length of the cycle set on the basis of the fuel amount. Accordingly, the post-addition halt period is set to have a length subtracted the length of the pre-addition halt period from the length of the halt period.

In a fuel addition control of the present invention, the length of the pre-addition halt period is varied in accordance with the catalyst bed temperature at the start point of the cycle T, and the length of the pre-addition halt period is reduced as the catalyst bed temperature gets lower. In the pre-addition halt period, the catalyst bed temperature is reduced in advance such that the catalyst bed temperature in the addition period is regulated as a lower temperature than a prescribed upper limit temperature (it will be referred as a bed temperature upper limit temperature for short in the following.) over which the degradation of the catalyst 8 is accelerated. In the case that the catalyst bed temperature at the start point of the cycle T is low, the catalyst bed temperature in the addition period can be regulated lower than the bed temperature upper limit temperature even when the length of the pre-addition halt period is reduced, since the catalyst bed temperature has already been lowered. Accordingly, the length of the pre-addition halt period is reduced as the catalyst bed temperature at the start point of the cycle T gets lower. Thus, the pre-addition halt period is set to have a time length R1 when the catalyst bed temperature at the start point of the cycle T is the temperature θ1, whereas the pre-addition halt period is set to have a time length R2 when the catalyst bed temperature at the start point of the cycle T is the temperature θ2, in the present invention, as shown in FIG. 2.

Figure 3:
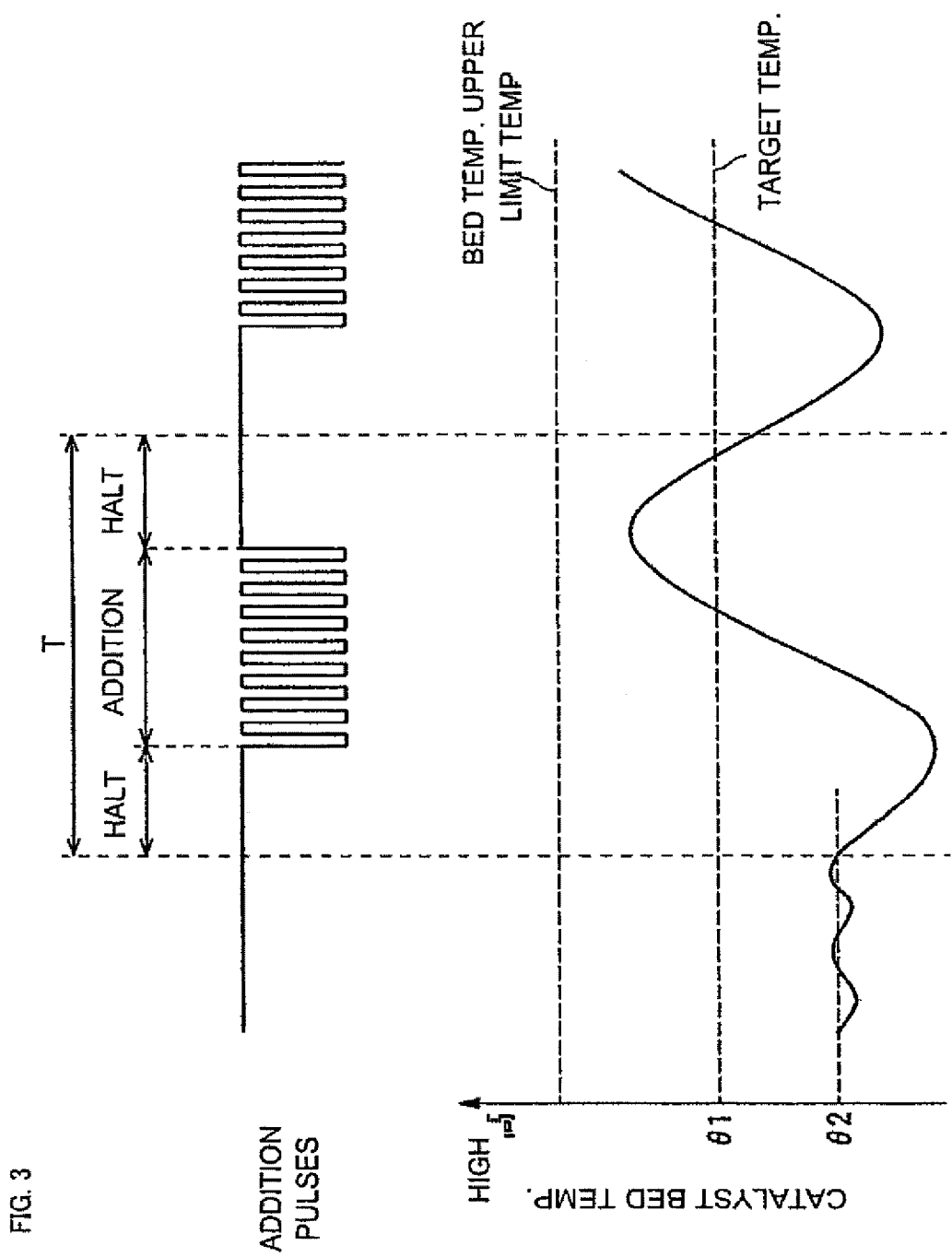
FIG. 3 is a view showing, as a comparative example, an example of the relation between the addition pulse for an addition valve and the catalyst bed temperature when a control is executed such that a half of the entire halt period is allocated to a pre-addition halt period.

FIG. 3 is a view showing an example of the relation between the addition pulse for the fuel addition valve 10 and the catalyst bed temperature as a comparative example when a fuel addition control is executed such that a half of the entire halt period in a cycle T is set to a pre-addition halt period. It is noted that FIG. 3 shows the control when the catalyst bed temperature at the start point of the cycle T is the same temperature θ2 as that of the line L2 in FIG. 2. As shown in FIG. 3, when the length of the pre-addition halt period is fixed to a half of the halt periods in a cycle, the catalyst bed temperature in the addition period can be regulated lower than the bed temperature upper limit temperature. However, the catalyst bed temperature in the period will be regulated unnecessarily lower than the bed temperature upper limit temperature.

Next, the details of the fuel addition timing control routine by ECU20 will be described with reference to FIG. 4 to FIG. 6. It is noted that FIG. 6 is a view for illustrating the control details of the routine of FIG. 4 as supplements, and shows a correspondence relation with FIG. 4 by adding the same symbols to the various values computed in the routine of FIG. 4.

Figure 4:
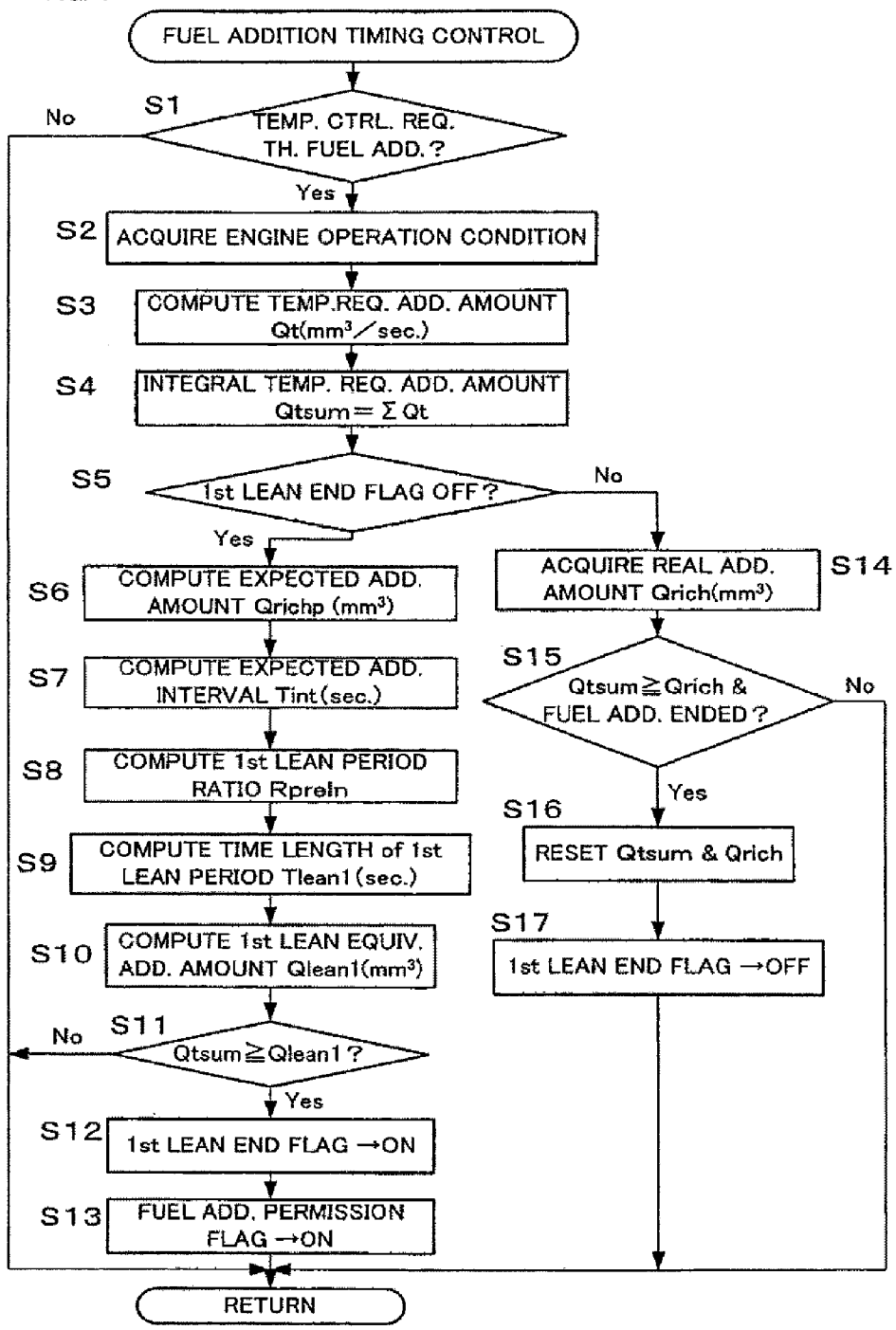
FIG. 4 is a flowchart showing a fuel addition timing control routine in the first embodiment.

The fuel addition timing control routine of FIG. 4 is executed repeatedly at a prescribed period during the operation of the engine 1. In the control routine of FIG. 4, ECU20 determines first at the step S1 whether a temperature control of the catalyst 8 through fuel addition from the fuel addition valve 10 is requested. The request is issued, on the basis of another routine executed by ECU20, when it is necessary to regulate the temperature of the catalyst 8 through fuel addition at a target temperature in S-regeneration. When it is determined that no temperature control request exists, the fuel addition timing control routine of the present turn is ended. On the other hand, when it is determined that the temperature control is requested, the operation is advanced to the step S2. ECU20 acquires the operating condition of the engine 1. For example, temperature of exhaust emission, flow rate of exhaust emission, catalyst bed temperature, and the like of the engine 1 are acquired as the operating condition of the engine 1. The catalyst bed temperature may be acquired by disposing a temperature sensor to the catalyst 8, or be acquired on the basis of the temperature of exhaust emission. Furthermore, it may be estimated on the basis of load, number of rotation, or the like of the engine 1. These acquiring methods may be well-known methods, therefore; their detailed descriptions will be omitted.

At the next step S3, ECU20 computes a temperature requesting addition amount Qt ($mm^3$/sec.). The temperature requesting addition amount Qt is a fuel addition amount per unit time required to regulate the catalyst 8 at a target temperature. It is defined on the basis of the target temperature of the catalyst 8 in executing the step S3 and the parameters affecting on the temperature of the catalyst 8, such as temperature of exhaust emission, flow rate of exhaust emission, and heat capacity of the catalyst 8. Some of these values are values varied in accordance with the operating condition of the engine 1. Accordingly, the addition amount computed at the step S3 is also varied successively with reference to the operation condition in executing the routine. ECU20 functions as temperature requesting addition, amount computing means of the present invention by executing the step S3.

At the subsequent step S4, ECU20 obtains an integral temperature requesting addition amount Qtsum ($mm^3$). The integral temperature requesting addition amount Qtsum is a value of integrating the temperature requesting addition amount Qt over a target range from the start point to the end point of a cycle of the fuel addition control. It increases gradually from the start point P1 of a cycle as shown in FIG. 6. When the integral temperature requesting addition amount Qtsum at the endpoint P3 of a cycle coincides with a real fuel addition amount Qrich which is added in the cycle, it turns out that just enough amount of fuel is added in the cycle to regulate the catalyst 8 at a target temperature.

At the next step S5, ECU20 determines whether a first lean end flag for determining whether the first lean period in FIG. 6 is ended is off, namely, whether the flag is in a state of meaning that the first lean period is still not ended. The first lean period corresponds to the pre-addition halt period in FIG. 2, however; it will be here referred as a lean period, since the air fuel ratio in the vicinity of the catalyst 8 is regulated to be lean when no fuel addition from the fuel addition valve 10 is execute.

When the first lean end flag is off, the operation is advanced to the step S6. ECU20 computes an expected addition amount Qrichp ($mm^3$). The expected addition amount Qrichp is given in the next equation.

$$Qrichp=[(\text{New Air Amount/Target Air Fuel Ratio})-\text{Injection Amount into Cylinder}]\times\text{Rich Time}$$

Here, the new air amount is an amount of air ($mm^3$) taken in the intake passage 3 from outside. The target air fuel ratio is a target value of the air fuel ratio in S-regeneration in the vicinity of the catalyst 8. The injection amount into cylinder is a fuel amount ($mm^3$) injected from the injector 30 into the cylinder(s) 2. Moreover, the rich time is the fuel addition time (sec.) in a cycle, which is defined uniquely from load of the engine 1 at the time point, temperature elevation characteristic of the catalyst 8, and a request for S release. Namely, the rich time is a time defined from a view point how many seconds fuel should be added in a cycle, and corresponds to the time length of the addition period in FIG. 2. From these relations, the expected addition amount Qrichp will mean a fuel addition amount required to keep the air fuel ratio in the vicinity of the catalyst 8 at a target air fuel ratio for exactly the rich time. When load of the engine 1 is varied in the rich time, the injection amount into cylinder is also varied. Thus, the addition amount Qrichp obtained here is just an expected value.

After the expected addition amount Qrichp is obtained at the step S6 in FIG. 4, the operation is advanced to the step S7. An expected addition interval Tint (sec) is computed in accordance with the next equation.

$$\text{Tint}=Qrichp/Qt$$

Namely, the expected addition interval Tint is a time required for the addition amount of fuel to reach the expected addition amount Qrichp, when it is assumed that fuel addition is continued at the fuel addition amount per unit time Qt computed at the step S3, and corresponds to the time length of a cycle.

Figure 7:
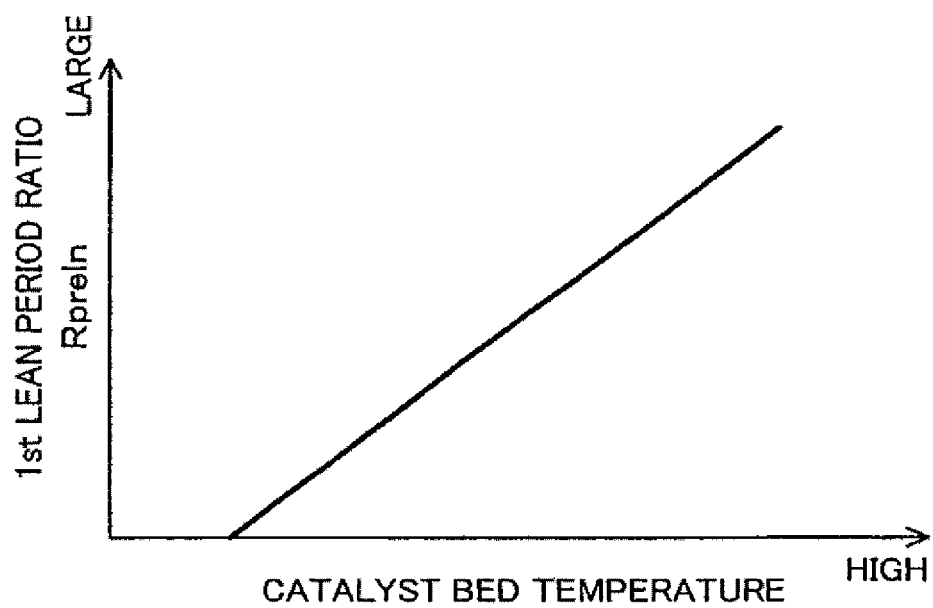
FIG. 7 is a view showing an example of the relation between the catalyst bed temperature at the start point of a cycle and the first lean period ratio.

At the subsequent step S8, ECU20 computes a first lean period ratio Rpreln. The first lean period ratio Rpreln is a value representing a ratio of the time length of the first lean period, namely, the length of the time to be allocated to the pre-addition halt period with respect to the entire halt periods in a cycle. For example, ECU20 computes the first lean period ratio Rprein with reference to a map representing the relation between the catalyst bed temperature at the start point of a cycle T and the first lean period ratio Rpreln, as illustrated in FIG. 7. As described above, in the fuel addition control of the present invention, the length of the pre-addition halt period is set shorter as the catalyst bed temperature at the start point of the cycle T gets lower. Thus, the first lean period ratio Rpreln gets smaller as the catalyst bed temperature gets lower. It is noted that the relation illustrated in FIG. 7 is obtained in advance in experiment or the like and is stored in ECU20 as a map. After the first lean period ratio Rpreln is computed, the operation is advanced to the step S9. ECU20 computes the time length of the first lean period Tlean1 (sec.) in accordance with the next equation.

$$T\text{lean1}=(\text{Tint}-\text{Rich Time})\times R\text{preln}$$

In this process, the time length of the entire halt periods in a cycle is obtained by subtracting the time length of the addition period, namely, the rich time used in the calculation at the step S6 from the time length of a cycle Tint, and a part of them is allocated to the time length of the first lean period Tlean1.

At the next step S10, a first lean equivalent addition amount Qlean1 ($mm^3$), which is the fuel addition amount converted from the time length of the first lean period Tlean1, is computed in accordance with the next equation.

$$Qlean1 = Tlean1 \times Qt$$

At the subsequent step S11, it is determined whether the integral temperature requesting addition amount Qtsum computed at the step S4 reaches the first lean equivalent addition amount Qlean1. Namely, in FIG. 6, fuel addition is halted until the integral temperature requesting addition amount Qtsum crosses the first lean equivalent addition amount Qlean1, and the first lean period is ended at the time point of crossing (the point P2 in FIG. 6). The determination is executed at the step S11 in FIG. 4. The reason why the determination is executed after the time length Tlean1 is converted to the first lean equivalent addition amount Qlean1 is that the temperature is not determined by the time but is determined by the given energy.

When the condition is disaffirmed at the step S11, ECU20 determines that the operation is still in the first lean period and ends the routine of the present turn. On the other hand, when the condition at the step S11 is affirmed, ECU20 determines that the first lean period is ended, and advances its operation to the step S12, and switches the first lean end flag to on. At the subsequent step S13, ECU20 switches the fuel addition permission flag to on, and thereafter ends the routine of the present turn.

Figure 5:
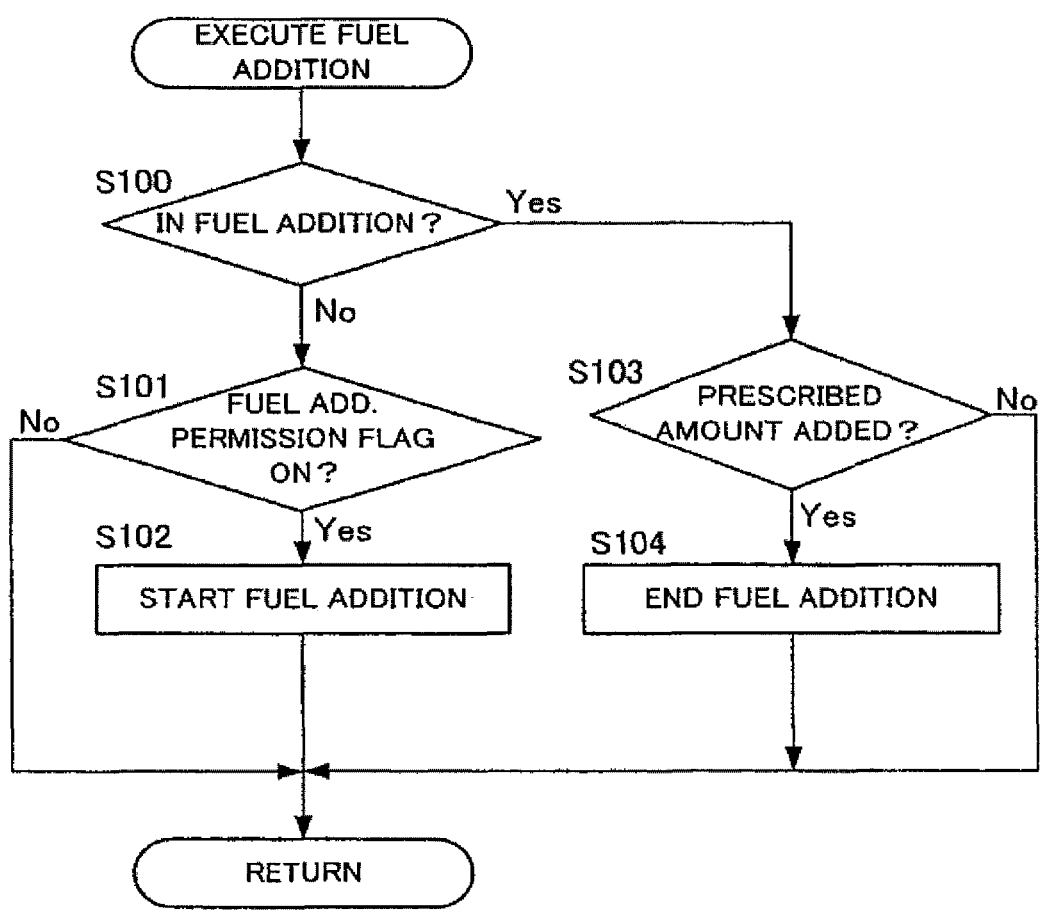
FIG. 5 is a flowchart showing a fuel addition executing routine in the first embodiment.
Figure 6:
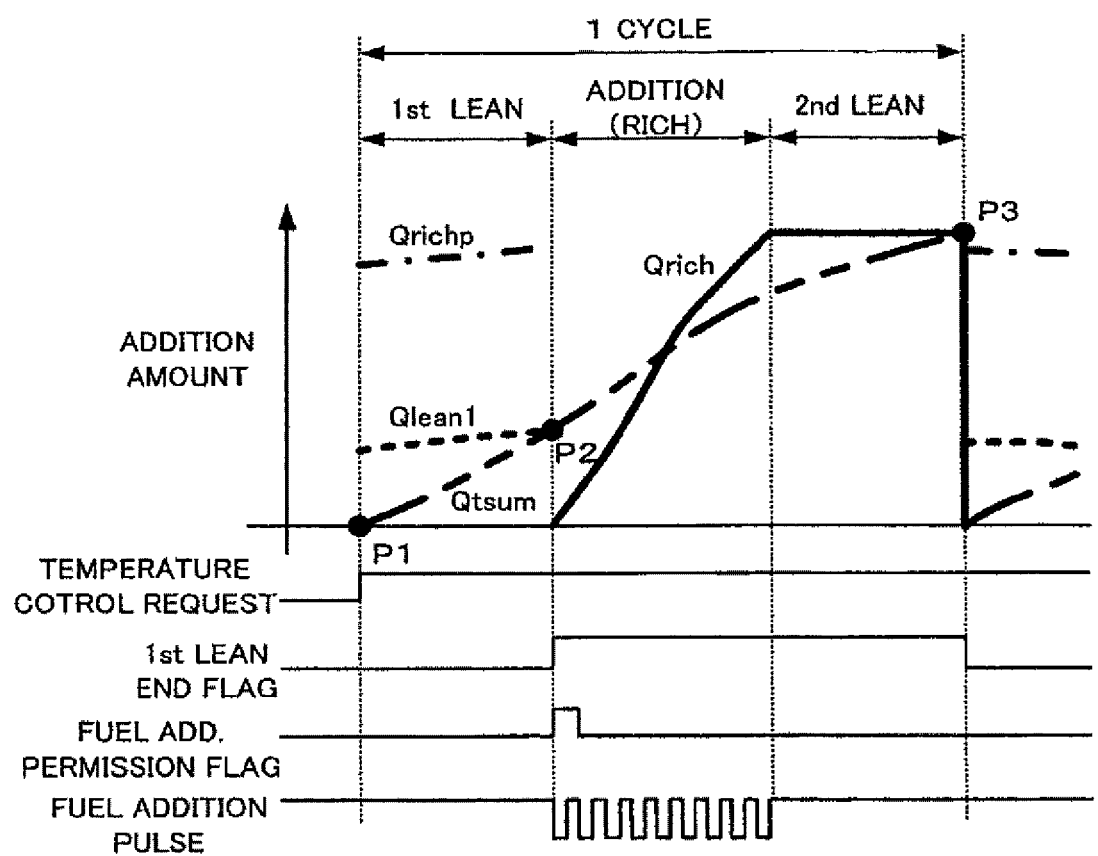
FIG. 6 is a view showing mutual relations between various values computed in a cycle by ECU, flags controlled by ECU, and fuel addition amount in the first embodiment.

ECU20 executes the fuel addition executing routine of FIG. 5 repeatedly at an appropriate period and concurrently with the routine of FIG. 4. In the routine of FIG. 5, it is determined at the step S100 whether the fuel addition valve 10 is in the operation of fuel addition. When it is not in the operation of fuel addition, it is monitored at the step S101 whether the fuel addition permission flag is turned on. When the fuel addition permission flag is turned on at the step S13 in FIG. 4, the step S101 in FIG. 5 is affirmed, and ECU20 makes the fuel addition valve 10 to start fuel addition at the step S102 in FIG. 5. Thus, the fuel addition in the fuel addition period is accomplished. When disaffirmatively determined at the step S101, the routine of FIG. 5 is ended. Once fuel addition is started, the condition at the step S100 in FIG. 5 is affirmed, and ECU20 advances its operation to the step S103 and determines whether fuel is added just for the rich time determined in the cycle (which is equal to the value used in the calculation at the step S9 in FIG. 4). When fuel is added, the operation is advance to the step S104. Fuel addition by the fuel addition valve 10 is finished, and thus the routine of FIG. 5 is ended. On the other hand, when disaffirmatively determined at the step S103, the routine of FIG. 5 is ended.

After fuel addition is started at the step S102 in FIG. 5, the condition at the step S5 is disaffirmed in the routine of FIG. 4. In this case, ECU20 advances its operation to the step S14 in FIG. 4. At the step S14, the amount of fuel added after the fuel addition permission flag is turned on is obtained as a real addition amount Qrich ($mm^3$). At the subsequent step S15, ECU20 determines whether the integral temperature requesting addition amount Qtsum is equal to or larger than the real addition amount Qrich and whether fuel addition from the fuel addition valve 10 is finished. Namely, it is determined whether the operation reaches the end time point P3 of the second lean period in FIG. 6. As long as disaffirmatively determined at the step S15, it is determined that the cycle is not ended, and the routine of the present turn is ended. On the other hand, when affirmatively determined at the step S15, the operation is advanced to the step S16. ECU20 resets the integral temperature requesting addition amount Qtsum and the real addition amount Qrich to the initial values of 0. At the subsequent step S17, ECU20 switches the first lean end flag to off, and thereafter ends the routine of FIG. 4.

In the above embodiment, ECU20 functions at the step S3 as temperature requesting addition amount computing means. ECU20 functions at the step S6 as expected addition amount computing means. ECU20 functions at the step S7 as period computing means. ECU20 functions in a combination of the steps S5, S10 to S13, S15 to S17 as addition timing control means. Furthermore, ECU20 functions at the step S9 as pre-addition halt period computing means.

As described above, the time length of the first lean period is set shorter in this embodiment as the catalyst bed temperature at the start point P1 of a cycle gets lower. Thus, fuel addition to the catalyst 8 can be executed promptly while preventing overheats of the catalyst 8 in the addition period. Suitable operation conditions of the catalyst 8 for S-regeneration are limited. Thus, even if the operating condition of the engine 1 reaches a suitable operation condition for S-regeneration in a transient operation or the like, during which the operating condition of the engine 1 can be easily varied, it might be changed in a short time to an unsuitable operation condition for S-regeneration. In the control shown in FIG. 3 as a comparative example, the pre-addition halt period, namely, the length of the first lean period, is fixed to a half of the entire halt periods in a cycle. Thus, the time length of the first lean period can be set unnecessarily long depending on the temperature of the catalyst 8. Thus, the operating condition of the engine 1 might be deviated from a suitable operation condition for S-regeneration in the first lean period, and the chance of S-regeneration might have been lost. As is apparent from the comparison between the line L2 of FIG. 2 and that in FIG. 3, since the time length of the first lean period is varied in accordance with the temperature of the catalyst 8 in the fuel addition control of the present invention, the first lean period can be set to have an appropriate time length able to prevent overheats of the catalyst 8 in the addition period. Depending on the catalyst bed temperature, the time length of the first lean period can be reduced. Thus, when the operating condition of the engine 1 is a suitable operation condition for S-regeneration, S-regeneration can be executed promptly.

Figure 8:
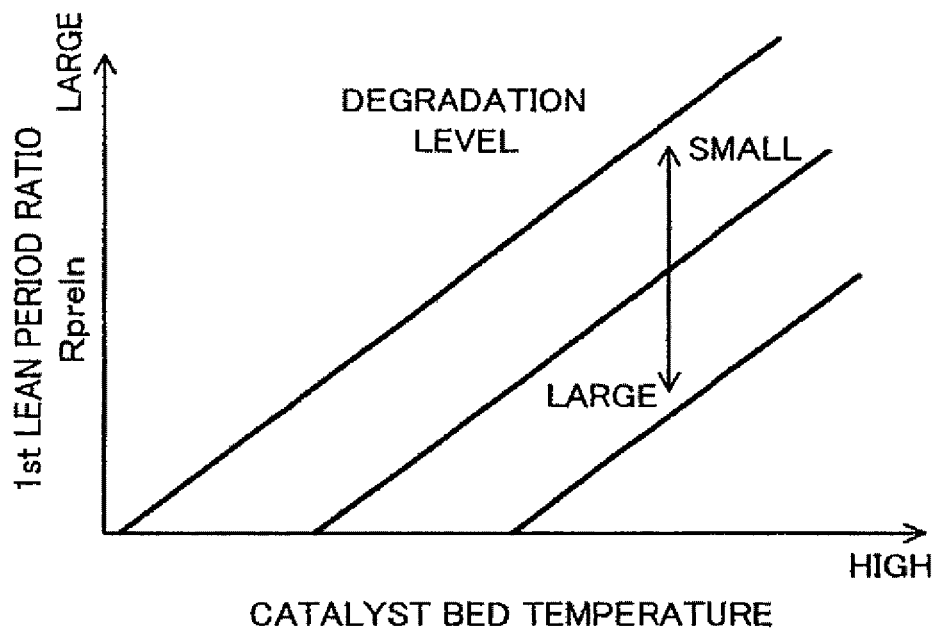
FIG. 8 is a view showing an example of the relation between a degradation level of a catalyst, the catalyst bed temperature at the start point of a cycle, and the first lean period ratio.

The method of computing the first lean period ratio Rpreln used at the step S8 in FIG. 4 is not limited to the above method. The elevation width of the catalyst bed temperature in fuel addition is varied in accordance with a level of degradation of the catalyst 8 (it will be referred as a degradation level for short in the following). The elevation width of the temperature gets smaller as the catalyst 8 is degraded. Namely, as the catalyst 8 is degraded, the catalyst bed temperature gets hard to be elevated in fuel addition. In this case, overheats of the catalyst 8 in fuel addition can be also prevented by setting a shorter time length of the pre-addition halt time than that before the catalyst 8 has been degraded. Thus, as illustrated in FIG. 8, the relation between the catalyst bed temperature at the start point of a cycle and the first lean period ratio Rpreln may be corrected in accordance with the degradation level of the catalyst 8. In FIG. 8, the degradation level of the catalyst 8 is first estimated. The relation between the catalyst bed temperature and the first lean period ratio Rpreln is corrected on the basis of the evaluated result. It is noted that the degradation level of the catalyst 8 may be estimated by a generally-known estimation method, for example, of estimating on the basis of the accumulated operation time of the engine 1 or the like. In FIG. 8, the time length of the first lean period is corrected such that the ratio of the first lean period gets smaller as the catalyst 8 is degraded, namely, the time length of the first lean period gets shorter as the catalyst 8 is degraded. The relation shown in FIG. 8 is obtained in advance, for example, in experiments or the like and is stored in ECU20 as a map.

The time length of the first lean period can be reduced further by correcting the first lean period ratio in accordance with the degradation level of the catalyst 8 in this manner. Thus, fuel addition to the catalyst 8 can be executed further promptly. It is noted that ECU20 functions as degradation level correcting means of the present invention by correcting the time length of the first lean period in accordance with the degradation level of the catalyst 8 in this manner.

Figure 9:
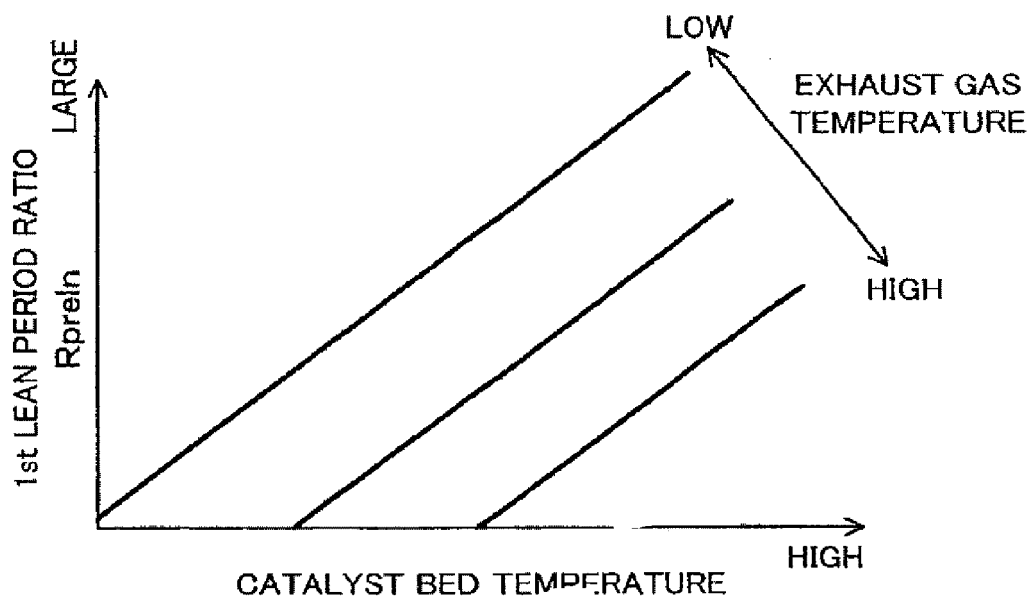
FIG. 9 is a view showing an example of the relation between the temperature of exhaust emission, the catalyst bed temperature at the start point of a cycle, and the first lean period ratio.

As shown in FIG. 2, the catalyst bed temperature is varied periodically in S-regeneration, and the center temperature of the temperature variation in this variation is affected by the temperature of exhaust emission. This is because the catalyst bed temperature in the fuel addition halt period approaches gradually to the temperature of exhaust emission. Accordingly, the upper limit of the temperature range within which the catalyst bed temperature is to be regulated in S-regeneration is defined by the bed temperature upper limit temperature of the catalyst 8, whereas the lower limit of the temperature range is defined by the temperature of exhaust emission. Since the temperature of exhaust emission is varied in accordance with the operating condition of the engine 1, by correcting the relation between the catalyst bed temperature and the first lean period ratio with the temperature of exhaust emission at the start point of a cycle, the time length of the first lean period ratio suitable for the operating condition of the engine 1 at the time can be computed. Thus, as illustrated in FIG. 9, the relation between the catalyst bed temperature when a temperature control is requested and the first lean period ratio may be corrected in accordance with the temperature of exhaust emission at the start of S-regeneration. As shown in FIG. 9, when the catalyst bed temperature is a same, the first lean period is corrected shorter as the temperature of exhaust emission gets higher.

Figure 10:
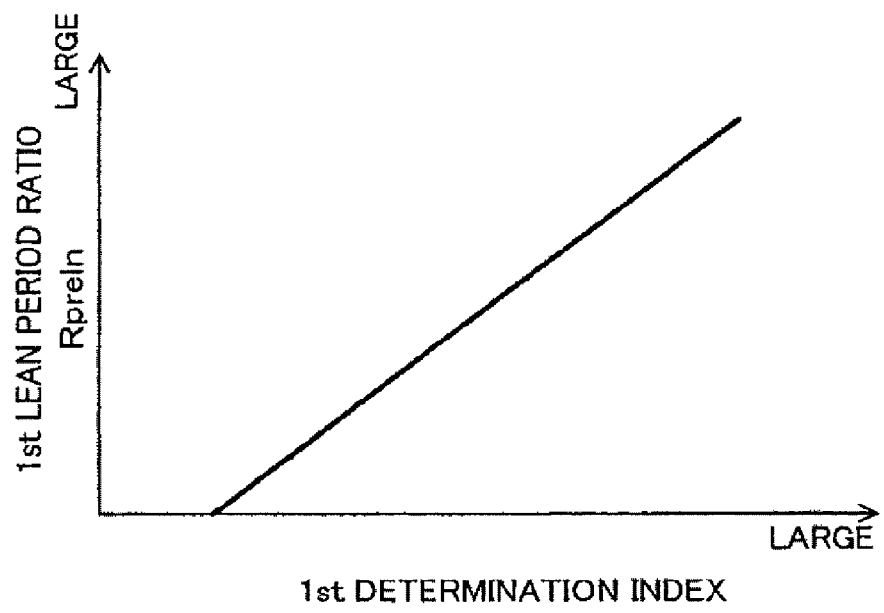
FIG. 10 is a view showing an example of the relation between the first determination index and the first lean period ratio.

Moreover, a first determination index, which is set on the basis of the catalyst bed temperature and the temperature of exhaust emission at the start point of a cycle, may be computed in accordance with the next equation, and the first lean period ratio may be computed on the basis of the first determination index. It is noted that the first lean period is computed from the first determination index by using the map illustrated in FIG. 10.

> First Determination Index=(Catalyst Bed Temperature−Temperature of Exhaust Emission)/(Bed Temperature Upper Limit Temperature−Temperature of Exhaust Emission)

The denominator of this equation represents a temperature width corresponding to a range of temperature within which the catalyst bed temperature should be regulated in S-regeneration, and the numerator represents a temperature difference between the catalyst bed temperature at the start point of a cycle and the temperature of exhaust emission. Accordingly in this equation, how much ratio of the temperature width to be regulated in S-regeneration corresponds to the temperature difference subtracted the temperature of exhaust emission at the time from the catalyst bed temperature at the start point of the cycle is computed as the first determination index. Thus, by computing the first lean period not only from the catalyst bed temperature, but also on the basis of the temperature difference between the temperature of exhaust emission and the catalyst bed temperature, which is the catalyst bed temperature with reference to the temperature of exhaust emission, overheats of the catalyst 8 in the addition period can be suppressed more reliably, as well as the first lean period suitable for the operating condition of the engine 1 at the time can be computed. Moreover, since the effect of the different center when the catalyst bed temperature is varied by the temperature of exhaust emission can be eliminated by computing the first lean period ratio in this manner using the relative temperature with reference to the temperature of exhaust emission, the much minimum first lean period can be computed with a good precision.

Figure 11:
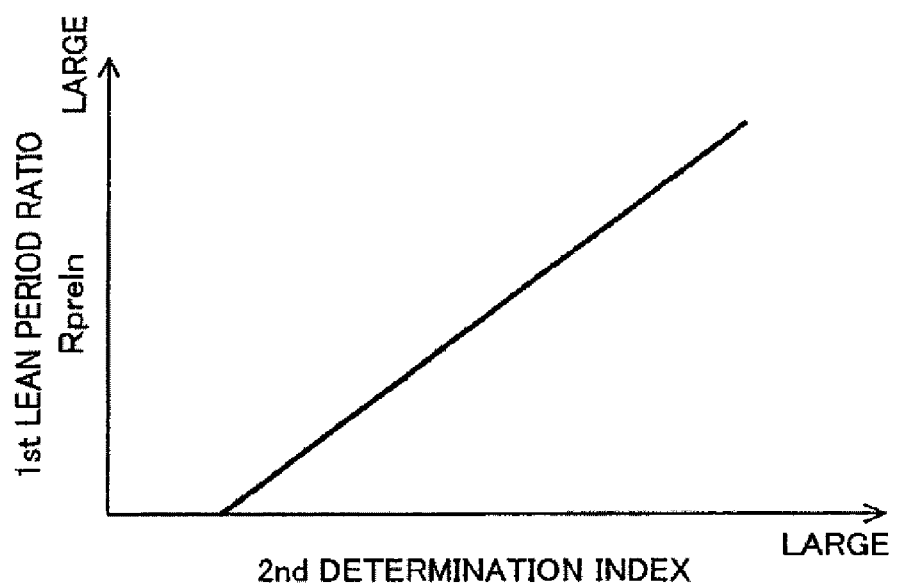
FIG. 11 is a view showing an example of the relation between the second determination index and the first lean period ratio.

Furthermore, since the fuel amount added from the fuel addition valve 10 in the addition period increases as the addition period in a cycle gets longer, the elevation width of the catalyst bed temperature in the addition period gets larger. Thus, the first lean period ratio is corrected in accordance with the time length of the addition period such that the first lean period gets longer as the addition period gets longer. In this case, the first lean period ratio is computed on the basis of the map illustrated in FIG. 11, for example. In FIG. 11, the first lean period ratio is obtained on the basis of a second determination index, which is computed, as shown in the next equation, by multiplying the first determination index used in FIG. 10 by the time length of the addition period (rich time).

> Second Determination Index=[(Catalyst Bed Temperature−Temperature of Exhaust Emission)/(Bed Temperature Upper Limit Temperature−Temperature of Exhaust Emission)]×Time Length of Addition Period The time length of the first lean period can be corrected as the addition period gets longer, by multiplying the time length of the addition period (rich time) in this manner. The much minimum first lean period can be computed more precisely by computing the first lean period in this manner. Thus, ECU20 functions as addition period correcting means by computing a longer length of the pre-addition halt period as the rich time gets longer.

In addition to the above, the variation width of the catalyst bed temperature in the addition period is affected by flow rate of exhaust emission and oxide concentration of exhaust emission. Thus, the first lean period may be corrected in accordance with such flow rate of exhaust emission and oxide concentration of exhaust emission.

It is noted that the correction of the time length of the first lean period on the basis of the degradation level of the catalyst 8, the temperature of exhaust emission, the time length of the addition period, flow rate of exhaust emission, and oxide concentration of exhaust emission may be executed either by using all of these physical quantities or by using a proper combination of a some of these physical quantities. When the correction is executed by using all of these physical quantities, the first lean period can be corrected to a more suitable time length in accordance with the operating condition of the engine 1. When some of these physical quantities are used for the correction, the computing method of the first lean period ratio can be simplified.

Second Embodiment

Figure 12:
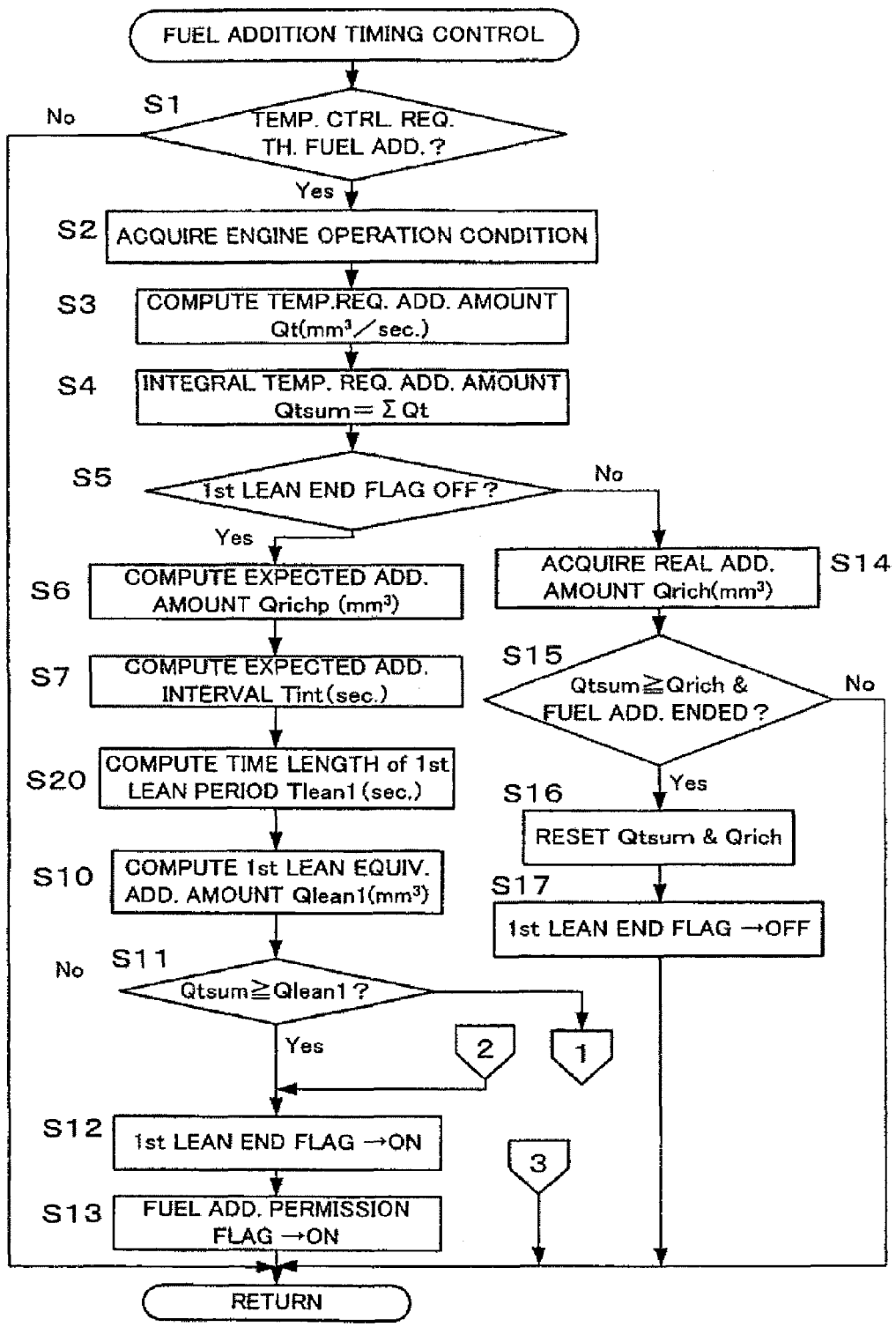
FIG. 12 is a flowchart showing a fuel addition timing control routine in the second embodiment.
Figure 13:
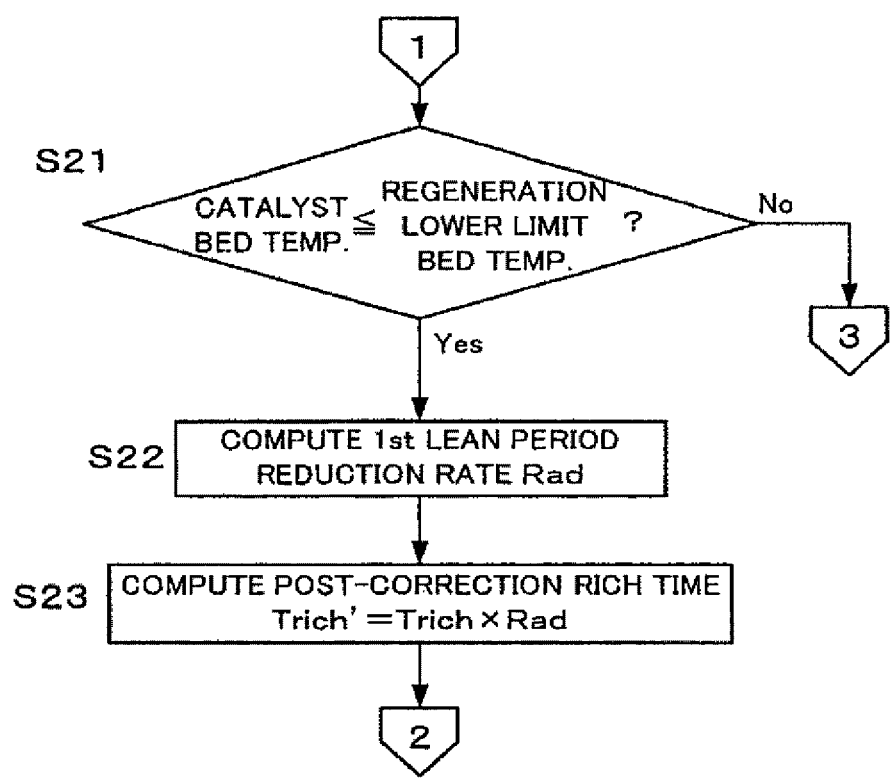
FIG. 13 is a flowchart subsequent to FIG. 12.
Figure 14:
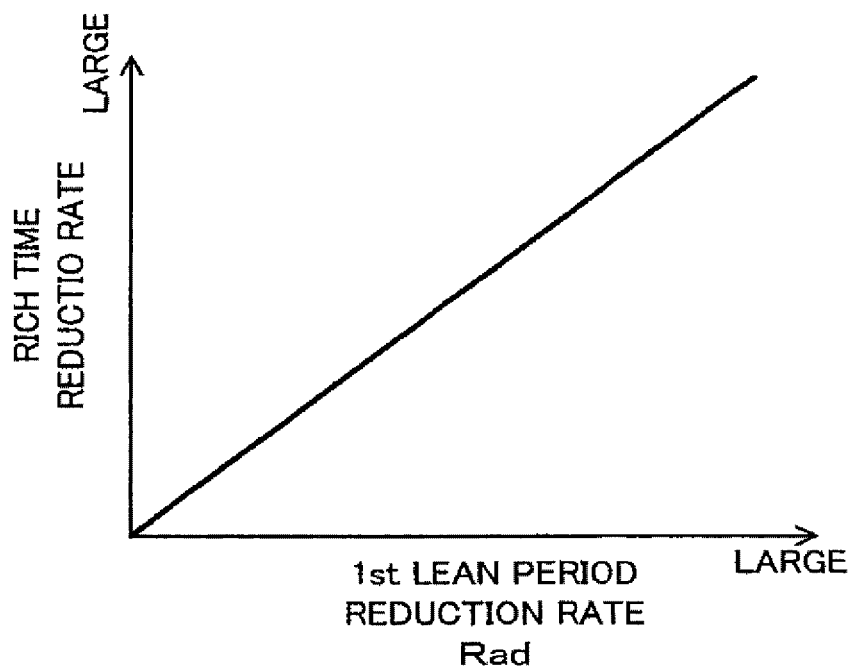
FIG. 14 is a view showing an example of the relation between the first lean period reduction rate and a rich time reduction rate.

Next, a second embodiment of the present invention will be described with reference to FIGS. 12 to 14. This embodiment differs from the first embodiment only in the details of the fuel addition timing control, and other structure is same as that of the first embodiment. Accordingly, the engine 1 is referred to FIG. 1. FIG. 12 is a flowchart showing a fuel adding timing control routine corresponding to FIG. 4 of the first embodiment. FIG. 13 is a flowchart subsequent to FIG. 12. It is noted that the fuel addition executing routine of FIG. 5 is also executed repeatedly at an appropriate period and concurrently with the control routine of FIG. 12 in the second embodiment in a similar manner to the first embodiment.

In the control routine of FIG. 12, the step S8 is deleted from the routine of FIG. 4, the step S20 is disposed in place of the step S9, and the steps S21 to S23 shown in FIG. 13 are further added. It is noted that the same processes in FIG. 12 and FIG. 13 as those in FIG. 4 have the same reference symbols, and their description will be omitted. The control routines of FIG. 12 and FIG. 13 are executed repeatedly at a prescribed period during the operation of the engine 1.

In the control routine of FIG. 12, ECU20 processes the routine up to the step S7 in a similar manner to the control routine of FIG. 4. At the next step S20, ECU20 sets the time length of the first lean period by multiplying the halt period by 0.5 in place of the first lean period ratio Rpreln in the first embodiment. Namely, in the second embodiment, a half of the halt periods are allocate to the first lean period. At the next step S10, ECU20 computes the first lean equivalent addition amount Qlean1. At the subsequent step S11, ECU20 determines whether the integral temperature requesting addition amount Qtsum reaches the first lean equivalent addition amount Qlean1. When it is affirmatively determined at the step S11, the processes at the steps S12 and S13 are executed, and thereafter the control routine of FIG. 11 is ended.

On the contrary, when disaffirmatively determined at the step S11, the operation is advanced to the step S21 in FIG. 13. ECU20 determines whether the catalyst bed temperature is equal to or higher than a prescribed regeneration lower limit temperature. As is generally known, S-regeneration of the catalyst 8 is executed when the catalyst bed temperature is elevated up to a target temperature (equal to or higher than 600° C., for example). As the catalyst bed temperature gets lower than the target temperature, sulfur oxide deposited in the catalyst 8 gets more hard to be decomposed and removed. Thus, the prescribed regeneration lower limit temperature is se as to a temperature, for example 600° C., at which decomposition or removal of sulfur oxide deposited in the catalyst 8 become hard to progress. When it is determined that the catalyst bed temperature is higher than the regeneration lower limit temperature, the control routine of the present turn is ended.

On the contrary, when it is determined that the catalyst bed temperature is equal to or lower than the regeneration lower limit temperature, the operation is advanced to the step S22. ECU20 computes a first lean period reduction rate Rad in accordance with the next equation, the first lean period reduction rate Rad represents a ratio of the time length really disposed as the first lean period with reference to the time length of the first lean period Tlean1 computed at the step S20.

$$Rad = Qtsum/Qlean1$$

Since the first lean equivalent addition amount Qlean1 is a value computed on the basis of the time length of the first lean period Tlean1, it is correlated with the computed time length of the first lean period Tlean1. On the other hand, since the integral temperature requesting addition amount Qtsum at the time when the step S21 is executed is an integral value of the temperature requesting addition amount Qt until the step S21 is executed, it is correlated with the time length from the start point of a cycle up to the time when the step S21 is executed. Namely, it is correlated with the time length really disposed as the first lean period. Accordingly, the first lean period reduction rate Rad can be computed by dividing the integral temperature requesting addition amount Qtsum by the first lean equivalent addition amount Qlean1.

At the next step S23, ECU20 corrects the length of the rich time on the basis of the first lean period reduction rate Rad. When affirmatively determined at the step S21 and the first lean period is reduced, the down width of the temperature of the catalyst 8 in the first lean period gets smaller than the case when the first lean period having a time length Tlean1 computed at the step S20 is disposed. Thus, in the case that the first lean period is reduced as illustrated in FIG. 14, overheats of the catalyst 8 might occur in the addition period unless the rich time is reduced in proportion to the reduction rate thereof. Thus, the rich time is corrected in accordance with the next equation such that the rich time is reduced in the same rate as the reduction rate of the first lean period. ECU20 functions as addition period length correcting means of the present invention by correcting the rich time in this manner.

$$Trich' = Trich \times Rad$$

In the processes following to this process, the post-correction rich time Trich' is used as a rich time in the control routines of FIG. 12 and FIG. 5. After the rich time is corrected at the step S23, the operation is advanced to the step S12 in FIG. 12, and the processes at the steps S12 and S13 are executed. Thereafter, the control routine of FIG. 12 is ended.

In this embodiment, since the first lean period is ended, even in the first lean period, at the time point when the catalyst bed temperature reaches equal to or lower than a prescribed regeneration lower limit temperature, the catalyst bed temperature can be kept at a suitable temperature for S-regeneration. Moreover, depending on the catalyst bed temperature, S-regeneration can be executed promptly by reducing the first lean period. Furthermore, since the rich time is also reduced in accordance with the reduction rate of the first lean period, overheats of the catalyst 8 in the addition period can be suppressed.

Figure 15:
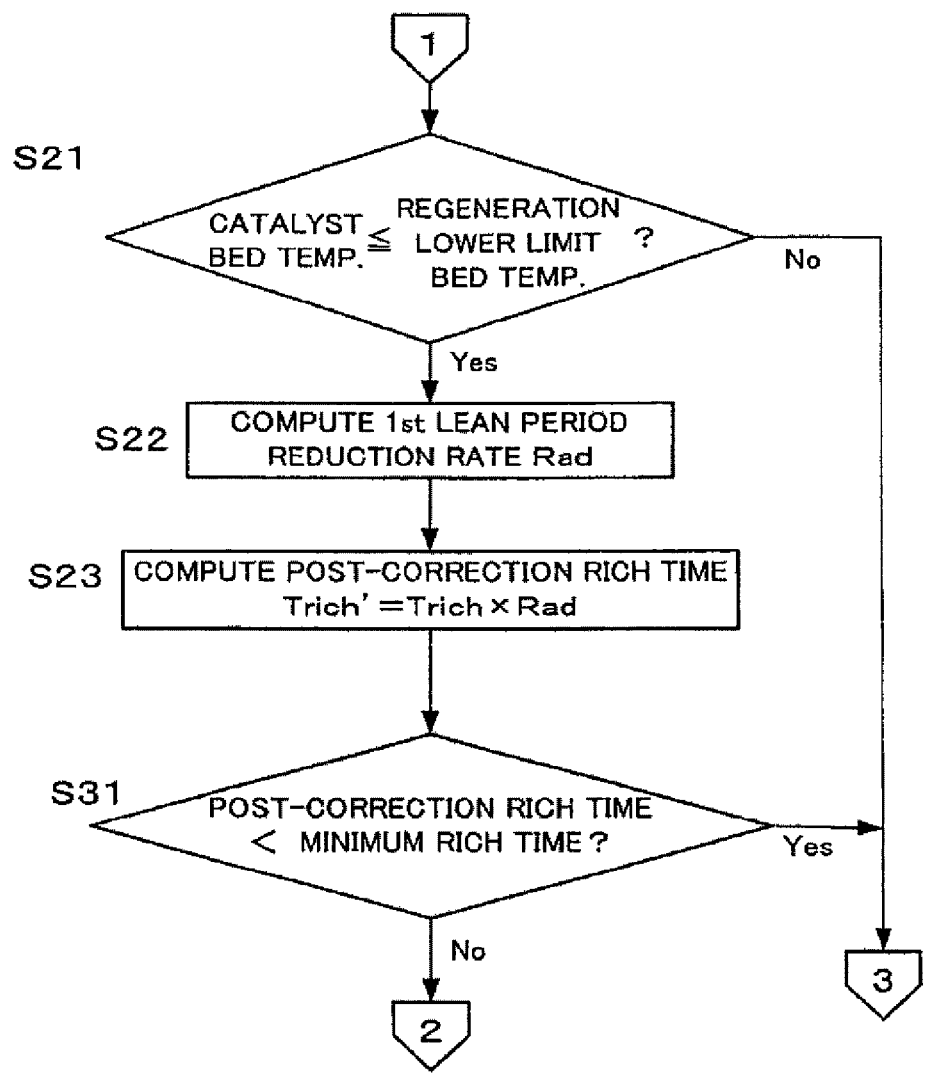
FIG. 15 is a flowchart showing a variation of the fuel addition timing control routine in the second embodiment.

FIG. 15 shows a variation of the fuel adding timing control routine of the second embodiment. In this variation, a part of the control routine of FIG. 12 corresponding to FIG. 13 is modified, and the rest thereof is same as the control routine of FIG. 12. Thus, FIG. 15 shows only the part of the control routine of FIG. 12 corresponding to FIG. 13. Furthermore, the same processes in FIG. 15 as those in FIG. 13 have the same reference symbols, and their description will be omitted.

In the control routine of FIG. 15, the step S31 is added after the step S23 in contrast to the routine of FIG. 13. At the step S31, it is determined whether the post-correction rich time Trich' is shorter than a preset minimum rich time. The minimum rich time is a minimum time a minimum required time from the start of S-regeneration on the catalyst 8 to the start of the S-regeneration effectively working on the catalyst 8, in other words, a minimum required time for effectively executing S-regeneration. Since the minimum rich time is varied in accordance with performance or capacity of the catalyst 8, or the like, for example, it may be varied appropriately in accordance with these parameters.

When the post-correction rich time Trich' is equal to or longer than the minimum rich time, the processes at the step S12 and S13 are executed. Namely, when disaffirmatively determined at the step S31, the first lean period is terminated, and fuel addition is allowed. Thereafter, the control routine of the present turn is ended.

On the contrary, when the post-correction rich time Trich' is shorter than the minimum rich time, the control routine of the present turn is ended. Namely, when affirmatively determined at the step S31, the first lean period is continued. In the case that affirmatively determined at the step S31 and the first lean period is continued, the value of the integral temperature requesting addition amount Qtsum is increased when the control routine of FIG. 15 is executed in the next time, and thus the first lean period reduction rate Rad is increased. Accordingly, the post-correction rich time Trich' is also increased. Namely, the first lean period is continued in the control routine of FIG. 15 until the post-correction rich time Trich' reaches equal to or longer than the minimum rich time.

In the variation shown in FIG. 15, the length of the rich time during which fuel addition is executed is set to equal to or longer than the minimum rich time. Since the minimum rich time is a minimum required time from the start of S-regeneration to the start of the S-regeneration effectively working on the catalyst 8 as described above, the rich time is ended in a condition of insufficient S-regeneration, even when fuel is added, in the case that the rich time is shorter than the minimum rich time. Accordingly, the fuel might be vainly added. In the variation of FIG. 15, since the length of the rich time is necessarily set to equal to or longer than the minimum rich time, unnecessary fuel addition to the catalyst 8 can be prevented. It is noted that when affirmatively determined at the step S31 and the first lean period is continued, the catalyst bed temperature gets temporally lowered equal to or lower than a prescribed regeneration lower limit temperature. However, the down in the catalyst bed temperature occurs mainly in the upstream part of the catalyst 8, and the down width of the temperature of the other parts (it will be referred as "post-middle-stream part.) is smaller than the temperature down width of the upstream part. As for the variation of the temperature of the catalyst 8, the upstream part into which exhaust emission is flowing is first varied, and then the temperature variation of the post-middle-stream part occurs later than the temperature variation of the upstream part. This is owing to the heat capacity of the catalyst 8. Accordingly, as long as it is a short time, even when the catalyst bed temperature of the upstream part reaches equal to or lower than the regeneration lower limit temperature, the catalyst bed temperature can be kept equal to or higher than the regeneration lower limit temperature in the post-middle-stream part. Thus, as long as it is a short time, even when the temperature of the upstream part of the catalyst Breaches equal to or lower than regeneration lower limit temperature, S-regeneration process of the post-middle-stream part can be done by executing fuel addition.

Figure 16:
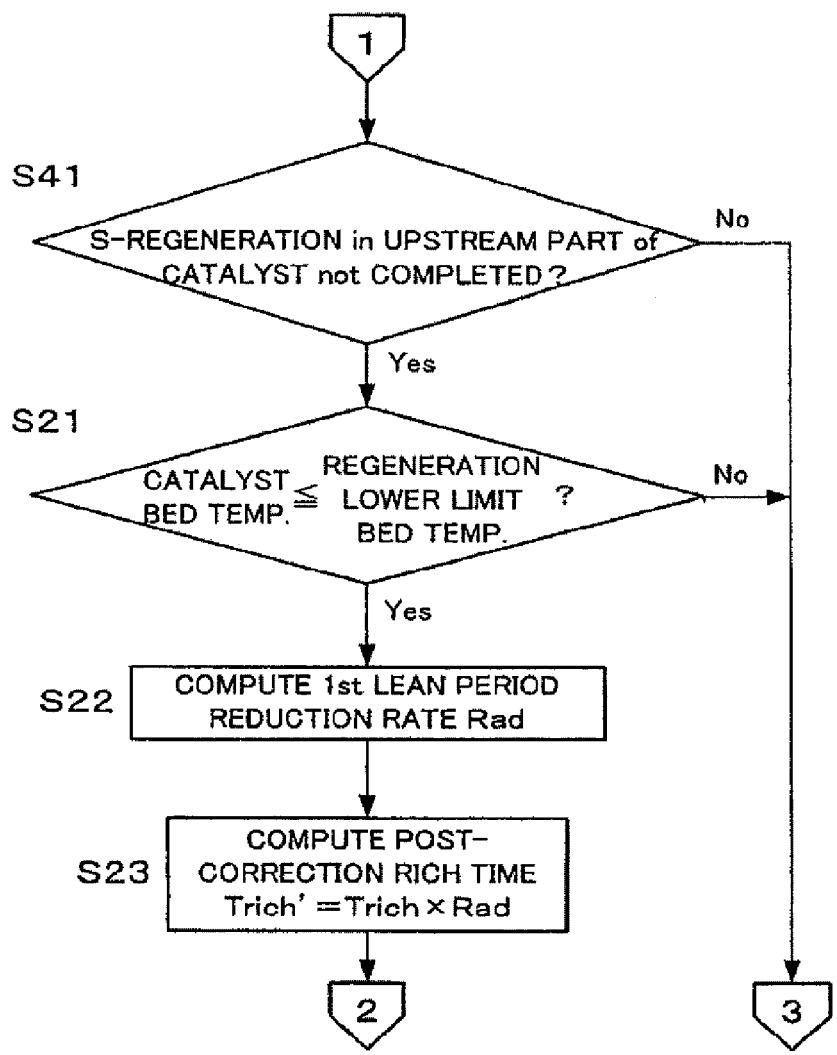
FIG. 16 is a flowchart showing another variation of the fuel addition timing control routine in the second embodiment.

Next, another variation of the fuel adding timing control routine of the second embodiment will be described with reference to FIG. 16. FIG. 16 also shows only the part of the control routine of FIG. 12 corresponding to FIG. 13 in a similar manner to FIG. 15. The parts other than the part shown in FIG. 16 are same as those of the control routine of FIG. 12. The same processes in FIG. 16 as those in FIG. 13 have the same reference symbols, and their description will be omitted.

In the control routine of FIG. 16, when disaffirmatively determined at the step S11, the process at the step S41 is first executed, and it is determined whether S-regeneration in the upstream part of the catalyst 8 is not completed. When it is determined that S-regeneration in the upstream part of the catalyst 8 is completed, the control routine of the present turn is ended. On the other hand, when it is determined that S-regeneration in the upstream part of the catalyst 8 is not completed, the operation is advance to the step S21, and the following processes are executed in a similar manner to the control routine of FIG. 12.

In the control routine of FIG. 16, the processes following the step S21 are executed only when S-regeneration in the upstream part of the catalyst 8 is necessary. As described above, as long as it is a short time, the post-middle-stream part of the catalyst 8 can be kept at a higher temperature than the regeneration lower limit temperature, even when the temperature of the upstream part of the catalyst 8 reaches equal to or lower than the regeneration lower limit temperature. Thus, by limiting the execution of the processes subsequent to the step S21 only when S-regeneration of the upstream part of the catalyst 8 is necessary as in this variation, the unnecessary reduction of the rich time after the completion of S-regeneration of the upstream part of the catalyst 8 can be prevented.

The present invention is not limited to the above embodiments and can be embodied in various forms. For example, the invention is not limited to a diesel engine and may be applied to various internal combustion engines utilizing gasoline or other fuel.

In the above embodiments, examples are described in which a NOx storage-reduction catalyst 8 is regulated at a target temperature in S-regeneration. The present invention is not limited to the above forms. The present invention can be applied to various cases when the temperature of an exhaust emission purifying device such as an exhaust emission purifying catalyst is required to be regulated at a target temperature fitted to any purposes. For example, the present invention can also be applied to a temperature control in a process of restoring filtering function of a filter, the filter is disposed for the purpose of trapping particulate material in exhaust emission, and the particulate material trapped in the filter is burned in the restoring process.

Fuel addition for a temperature control is also not limited to that by the fuel addition valve disposed in the exhaust passage at the upstream of the catalyst. For example, a post injection utilizing the injector 30, namely, the injection performed for the purpose of fuel addition to exhaust emission after the main injection for the purpose of combustion in the cylinder 2, may be controlled in accordance with the present invention. The fuel addition amount may be controlled by taking account of fuel adhesion, evaporation, and transfer delay in the exhaust passage 4.

As described above, according to the fuel addition control method of the present invention, a pre-addition halt period is disposed before the addition period, and the length of the pre-addition halt period is varied in accordance with the temperature of the exhaust emission purifying device at the start point of a cycle. Thus, while suppressing the extreme elevation of the temperature of the exhaust emission purifying device in the addition period, it can be prevented that an unnecessarily long pre-addition halt period is disposed. Accordingly, fuel addition can be executed promptly. Furthermore, according to an exhaust emission purifier of the present invention, a pre-addition halt period with the length set on the basis of the temperature of the NOx storage-reduction catalyst at the start point of a cycle is disposed before the addition period. Thus, while suppressing overheats of the NOx storage-reduction catalyst in the addition period, fuel addition to the NOx storage-reduction catalyst can be executed promptly.

What is claimed is:

1. An exhaust emission purifier of an internal combustion engine, comprising:
    a NOx storage-reduction catalyst disposed in an exhaust passage of the internal combustion engine;
    a fuel addition valve of adding fuel from upstream of the NOx storage-reduction catalyst; and
    an electric control unit (ECU) programmed to function as an addition control device which is configured to control the fuel addition valve such that cycles are repeated in order that the NOx storage-reduction catalyst is to be regulated at a target temperature, the cycle being a combination of an addition period during which the fuel is added from the fuel addition valve and a halt period during which the fuel addition from the fuel addition valve is halted, and the fuel addition valve being operated such that the halt period is split to sandwich the addition period in each of the cycles, wherein the addition control device is configured to comprise:

temperature requesting addition amount computing means which is configured to compute a fuel addition amount required to regulate the NOx storage-reduction catalyst at the target temperature;

expected addition amount computing means which is configured to compute another fuel addition amount required to keep the air fuel ratio in the NOx storage-reduction catalyst at a target air fuel ratio over a prescribed period;

period computing means which is configured to compute a length of the cycle based on the addition amounts computed respectively by the temperature requesting addition amount computing means and the expected addition amount computing means and to compute a length of the halt period in the cycle by subtracting the prescribed period serving as the addition period from the length of the cycle obtained;

pre-addition halt period computing means which is configured to compute the length of a pre-addition halt period, which is a halt period disposed before the addition period, based on the length of the halt period computed by the period computing means and a temperature of the NOx storage-reduction catalyst at a start point of the cycle; and addition timing control means which is configured to control fuel addition permission from the fuel addition valve such that a pre-addition halt period having the length computed by the pre-addition halt period computing means is disposed before the addition period, wherein the pre-addition halt period computing means is configured to compute a length of the pre-addition halt period based on a temperature difference between the temperature of the NOx storage-reduction catalyst at the start point of the cycle and a temperature of exhaust emission of the internal combustion engine at the start point of the cycle.

2. The exhaust emission purifier of an internal combustion engine according to claim 1, wherein the pre-addition halt period computing means is configured to compute a shorter length of the pre-addition halt period as the temperature of the NOx storage-reduction catalyst at the start point of the cycle gets lower.

3. The exhaust emission purifier of an internal combustion engine according to claim 1, wherein the pre-addition halt period computing means comprises degradation level correcting means which is configured to correct the length of the pre-addition halt period shorter as the NOx storage-reduction catalyst is degraded.

4. The exhaust emission purifier of an internal combustion engine according to claim 1, wherein the pre-addition halt period computing means is configured to compute a ratio of time length of the pre-addition halt period to the halt period in the cycle based on a ratio of a difference between catalyst bed temperature as the temperature of the NOx storage-reduction catalyst and the temperature of exhaust emission of the internal combustion engine to a difference between an upper limit of the catalyst bed temperature and the temperature of exhaust emission, and to compute the length of the pre-addition halt period based on the ratio.

5. The exhaust emission purifier of an internal combustion engine according to claim 1, wherein the pre-addition halt period computing means comprises addition period correcting means which is configured to correct the length of the pre-addition halt period longer as the addition period gets longer.

6. The exhaust emission purifier of an internal combustion engine according to claim 1, wherein the addition timing control means is configured to add fuel from the fuel addition valve in order that the addition period should start at the time point when the temperature of the NOx storage-reduction catalyst reaches equal to or lower than the prescribed lower limit temperature, in the case that the temperature of the NOx storage-reduction catalyst in the pre-addition halt period reaches equal to or lower than a preset prescribed lower limit temperature.

7. The exhaust emission purifier of an internal combustion engine according to claim 6, wherein the addition control device further comprises addition period length correcting means which is configured to correct the length of the addition period based on a ratio between a time from the start point of the cycle to the time point when the temperature of the exhaust emission purifying device reaches equal to or lower than the prescribed lower limit temperature in the pre-addition halt period and the length of the pre-addition halt period computed by the pre-addition halt period computing means.

8. The exhaust emission purifier of an internal combustion engine according to claim 7, wherein the addition timing control means is configured to continue the pre-addition halt period by prohibiting fuel addition from the fuel addition valve even when the temperature of the NOx storage-reduction catalyst reaches equal to or lower than the prescribed lower limit temperature in the pre-addition halt period, in the case that the length of the addition period corrected by the addition period length correcting means is equal to or shorter than a preset prescribed lower limit.

9. The exhaust emission purifier of an internal combustion engine according to claim 6, wherein the addition control device is configured to regulate the temperature of the NOx storage-reduction catalyst at a target temperature, when S-regeneration process in which sulfur oxide is released from the NOx storage-reduction catalyst is requested, and the addition timing control means is configured to add fuel from the fuel addition valve such that the addition period should start at the time point when the temperature of the NOx storage-reduction catalyst reaches equal to or lower than the prescribed lower limit temperature, in a case that it is required to execute S-regeneration process of an upstream part of the catalyst, which is an upstream part of the NOx storage-reduction catalyst in a flow of exhaust emission, and also the temperature of the NOx storage-reduction catalyst in the pre-addition halt period reaches equal to or lower than the prescribed lower limit temperature.

* * * * *